(No Model.)
W. ELLINGER.
APPARATUS FOR BRANDING OR MARKING ANIMALS.
No. 356,459. Patented Jan. 25, 1887.
FIG. 2.
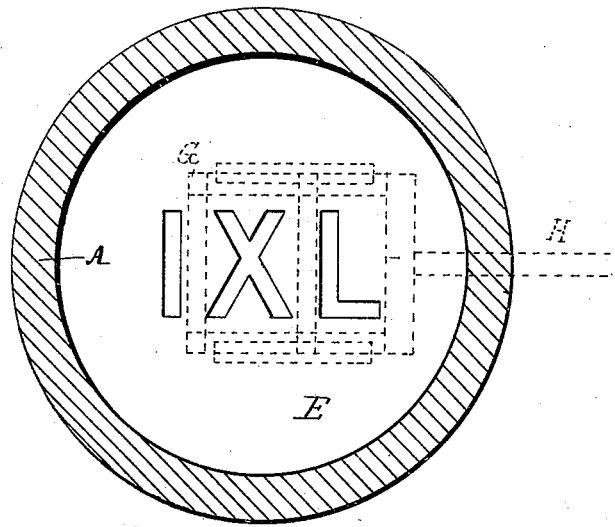
FIG. 1.
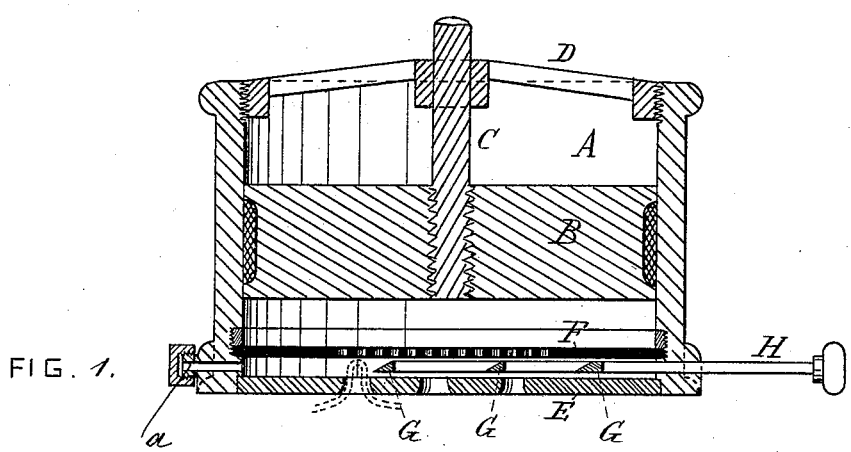
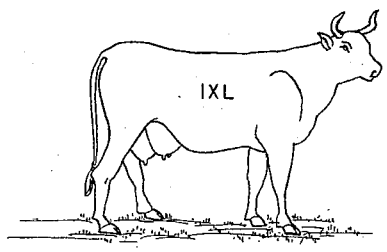
FIG. 3.
WITNESSES
Wm. A. Lowe
T. Turner
INVENTOR
W. Ellinger
by his attorneys
Roeder & Briesen

UNITED STATES PATENT OFFICE.

WILLIAM ELLINGER, OF NEW YORK, N. Y.

APPARATUS FOR BRANDING OR MARKING ANIMALS.

SPECIFICATION forming part of Letters Patent No. 356,459, dated January 25, 1887.

Application filed April 5, 1886. Serial No. 197,786. (No model.)

*To all whom it may concern:*

Be it known that I, WILLIAM ELLINGER, of the city of New York, county and State of New York, have invented a new and Improved Apparatus for Branding or Marking Animals, of which the following specification is a full, clear, and exact description.

This invention relates to an apparatus for marking horses, mules, cattle, and other animals; and it consists of the improvement hereinafter more fully described.

Figure 1 is a vertical section of the apparatus. Fig. 2 is a plan of the plate with the design to be marked on the animal. Fig. 3 shows an animal after being marked.

The apparatus consists of a chamber, A, in which a piston, B, works attached to a rod, C, guided in a cross-piece, D, attached to the top of the chamber A, the whole forming a suction-pump. In the bottom of the chamber A a plate, E, is fixed, in which the desired mark "IXL," as shown in the drawings, which is to be branded upon the animal, is cut out. Above this plate E a finely-perforated plate, F, is attached to the chamber A, which may be so arranged as to be moved nearer to or farther away from the plate E. Against the under side of this plate F a knife or knives, G, are arranged, capable of sliding freely in suitable ways and connected to a rod, H, to operate said knives.

The operation is as follows: The bottom of the chamber A is placed against the side of the cattle to be marked, being made as air-tight as possible, either by suitable packing material—such as woolen cloth—or by a layer of cattle-dung. By then withdrawing the piston a vacuum will be formed below the piston, in consequence of which the skin of the animal will be drawn through the openings of the mark or design cut into the plate E until the same is stopped by the plate F. As before stated, the plate F being made so that its distance from the plate E may be regulated, the distance the skin of the animal will be drawn upward or within the chamber A can easily be thereby regulated. The knives G are then operated so as to pass through the raised part of the skin, cutting the upper part off, and as the same corresponds with the cut openings in the plate E or with the desired mark the animal will thereby be effectually marked.

By attaching a suitable spring-lever to the rod H the knife can be made to operate automatically whenever the piston has arrived at any desired point where the piston can be made to come in contact with said spring-lever.

If it is desired to burn the skin before or after the same has been cut as above described, a flame may be introduced between the plates E and F through an opening, *a;* or an electric spark may be sent through that opening for the same purpose.

I claim as my invention—

In combination with a chamber, A, having piston B and rod C, forming a vacuum-pump, the plate E, having the desired mark to be branded cut out, the perforated plate F, and the knives G, arranged to operate in the manner and for the purpose specified.

WILLIAM ELLINGER.

Witnesses:
HENRY E. ROEDER,
F. V. BRIESEN.